US010961904B2

(12) United States Patent
Kagimoto et al.

(10) Patent No.: US 10,961,904 B2
(45) Date of Patent: Mar. 30, 2021

(54) TURBOCHARGER

(71) Applicant: MITSUBISHI HEAVY INDUSTRIES ENGINE & TURBOCHARGER, LTD., Sagamihara (JP)

(72) Inventors: Yoshimi Kagimoto, Tokyo (JP); Tatsuya Ishizaki, Tokyo (JP); Yuta Ishii, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 127 days.

(21) Appl. No.: 16/098,220

(22) PCT Filed: Oct. 26, 2017

(86) PCT No.: PCT/JP2017/038803
§ 371 (c)(1),
(2) Date: Nov. 1, 2018

(87) PCT Pub. No.: WO2019/082365
PCT Pub. Date: May 2, 2019

(65) Prior Publication Data
US 2020/0158010 A1   May 21, 2020

(51) Int. Cl.
*F02B 39/14* (2006.01)
*F01D 25/16* (2006.01)
*F01D 25/18* (2006.01)

(52) U.S. Cl.
CPC .............. *F02B 39/14* (2013.01); *F01D 25/16* (2013.01); *F01D 25/18* (2013.01); *F05D 2220/40* (2013.01); *F05D 2240/55* (2013.01)

(58) Field of Classification Search
CPC .......... F02B 39/14; F01D 25/18; F01D 25/16; F01D 25/24; F05D 2220/40; F05D 2240/55
See application file for complete search history.

(56) References Cited

U.S. PATENT DOCUMENTS

| 4,752,193 A | 6/1988 | Horler |
| 5,803,719 A | 9/1998 | Ramsden et al. |

(Continued)

FOREIGN PATENT DOCUMENTS

| CN | 103375259 A | 10/2013 |
| CN | 104884763 A | 9/2015 |

(Continued)

OTHER PUBLICATIONS

International Search Report, issued in PCT/JP2017/038803, PCT/ISA/210, dated Jan. 16, 2018.

(Continued)

Primary Examiner — Audrey K Bradley
Assistant Examiner — Edward Bushard
(74) Attorney, Agent, or Firm — Birch, Stewart, Kolasch & Birch, LLP.

(57) ABSTRACT

A turbocharger for supercharging an internal combustion engine includes: a bearing housing which accommodates a bearing supporting a rotational shaft of the turbocharger; an oil discharge port for discharging lubricant oil stored in an internal space of the bearing housing; an air pocket formed in the oil discharge port or an oil discharge pipe connected to the oil discharge port; and a communication flow passage which brings the air pocket and the internal space into communication.

12 Claims, 15 Drawing Sheets

(56) References Cited

U.S. PATENT DOCUMENTS

| | | |
|---|---|---|
| 7,946,118 B2 | 5/2011 | Hippen et al. |
| 2011/0023849 A1 | 2/2011 | Cattani et al. |
| 2013/0280032 A1 | 10/2013 | Stump et al. |
| 2015/0369081 A1 | 12/2015 | Takabatake et al. |
| 2017/0276233 A1 | 9/2017 | Nishioka et al. |
| 2017/0298771 A1 | 10/2017 | Race et al. |

FOREIGN PATENT DOCUMENTS

| | | |
|---|---|---|
| JP | 60-47821 A | 3/1985 |
| JP | 60-156935 A | 8/1985 |
| JP | 62-61942 U | 4/1987 |
| JP | 64-32429 U | 3/1989 |
| JP | 3-87933 U | 9/1991 |
| JP | 2002-364376 A | 12/2002 |
| JP | 2010-169036 A | 8/2010 |
| JP | 2014-15917 A | 1/2014 |
| JP | 2015-38331 A | 2/2015 |
| JP | 2018-25122 A | 2/2018 |
| WO | WO 2008/042698 A1 | 4/2008 |
| WO | WO 2014/109849 A1 | 7/2014 |
| WO | WO 2015/013114 A1 | 1/2015 |
| WO | WO 2016/098230 A1 | 6/2016 |
| WO | WO 2017/180588 A1 | 10/2017 |

OTHER PUBLICATIONS

Written Opinion of the International Searching Authority, issued in PCT/JP2017/038803, PCT/ISA/237, dated Jan. 16, 2018.
European Office Action for European Application No. 17909651.6, dated Feb. 10, 2020.
Extended European Search Report for European Application No. 19217618.8, dated Feb. 14, 2020.
Extended European Search Report dated Jun. 3, 2019 issued to the corresponding European Application No. 17909651.6.
Office Action dated May 21, 2019 issued in the corresponding JP Application No. 2018-537554.
Chinese Office Action dated Aug. 27, 2020 issued in counterpart Chinese Application No. 201780026085.2.

TURBOCHARGER

TECHNICAL FIELD

The present disclosure relates to a turbocharger for supercharging an internal combustion engine.

BACKGROUND ART

A known turbocharger drives a compressor coupled to a rotational shaft, and thereby supercharges an internal combustion engine. The rotational shaft of the turbocharger is supported rotatably by a bearing accommodated in a casing. The bearing supporting the rotational shaft is housed in a bearing housing, and the bearing housing is supplied with lubricant oil from an oil pan or the like, which lubricates each component.

The lubricant oil used for the bearing is returned to the oil pan, via an oil discharge pipe from an oil discharge port disposed below the bearing housing. Herein, depending on the operation state of the turbocharger, if the internal pressure of the bearing housing, from which the lubricant oil is discharged, becomes lower than the internal pressure of the oil pan, to which the lubricant oil is discharged, discharge of the lubricant oil to the oil pan may become hindered. In case discharge of the lubricant oil is hindered as described above, the amount of lubricant oil accumulated in the bearing housing increases, and the liquid surface of the lubricant oil rises. Then, lubricant oil may leak outside from the gap of the bearing housing (the bearing housing is configured to receive a rotational shaft, and thus has some gap in the vicinity of the rotational shaft in particular). If lubricant oil leaks to the compressor housing side housing the compressor in particular, the lubricant oil enters the combustion chamber of the internal combustion engine with intake air, which may produce white smoke or cause degraded oil substances to adhere and accumulate, causing a decrease in the performance of the internal combustion engine.

To solve the above problem, Patent Document 1 discloses providing an air guide pipe which brings a bearing housing from which lubricant oil is discharged and an oil pan to which lubricant oil is discharged into communication, to equalize the internal pressure of the bearing housing and the internal pressure of the oil pan and promote discharge of lubricant oil.

CITATION LIST

Patent Literature

Patent Document 1: JPH1-32429U

SUMMARY

Problems to be Solved

In Patent Document 1, the air guide pipe is provided to promote discharge of lubricant oil. However, providing the air guide pipe makes the apparatus configuration of the turbocharger more complex, which may increase production cost and damage risk, or lead to deterioration of the assembling performance.

Furthermore, in a case where the inner diameter of the oil discharge pipe is sufficiently large, it is possible to equalize the internal pressures of the bearing housing and the oil pan by causing air to flow backward in the remaining space not filled with the lubricant oil inside the discharge pipe. Thus, it is unnecessary to provide the air guide pipe described in Patent Document 1. Nevertheless, increasing the inner diameter of the oil discharge pipe leads to an increase in the size of the entire apparatus, and thus the inner diameter of the discharge pipe cannot be increased unlimitedly. In particular, a discharge port is disposed in the lowest section of the bearing housing, and thus the lubricant oil from various parts of the bearing housing is likely to gather and block the discharge port. Thus, it is often difficult to discharge lubricant oil smoothly through an oil discharge pipe having a relatively small inner diameter.

At least one embodiment of the present invention was made in view of the above, and an object is to provide a turbocharger whereby it is possible to promote discharge of lubricant oil from a bearing housing through a compact and simple configuration.

Solution to the Problems (1) According to at least one embodiment of the present invention, a turbocharger for supercharging an internal combustion engine includes: a bearing housing which accommodates a bearing supporting a rotational shaft of the turbocharger; an oil discharge port for discharging lubricant oil stored in an internal space of the bearing housing; an air pocket formed in the oil discharge port or an oil discharge pipe connected to the oil discharge port; and a communication flow passage which brings the air pocket and the internal space into communication.

With the above configuration (1), the air pocket formed in the oil discharge pipe is in communication with the internal space of the bearing housing via the communication flow passage. Accordingly, even if lubricant oil accumulates in the vicinity of the oil discharge port, it is possible to supply air to the internal space from the air pocket via the communication flow passage, and thus it is possible to prevent a decrease in the internal pressure of the bearing housing.

(2) In some embodiments, in the above configuration (1), the air pocket is disposed along a circumferential direction of the oil discharge port, at a most upstream portion of the oil discharge pipe.

According to the above configuration (2), the air pocket is formed along the circumferential direction of the oil discharge port, at the most upstream portion of the oil discharge pipe, and thus it is possible to lay out the communication flow passage flexibly.

(3) In some embodiments, in the above configuration (2), the air pocket is formed by a step formed between the most upstream portion of the oil discharge pipe and the oil discharge port having a smaller diameter than the most upstream portion.

With the above configuration (3), it is possible to form the air pocket in the vicinity of the oil discharge port by utilizing the step formed by making the diameter of the oil discharge port smaller than that of the most upstream portion of the oil discharge pipe.

(4) In some embodiments, in any one of the above configurations (1) to (3), the turbocharger further includes: an insert member inserted into the internal space; and a seal member disposed along a circumferential direction of the rotational shaft to seal a gap between the insert member and the bearing housing. The communication flow passage is in communication with the internal space from above, via a seal groove formed on the bearing housing to accommodate the seal member.

According to the above configuration (4), the communication flow passage is in communication with the internal space via the seal groove accommodating the seal member for sealing the gap between the insert member and the bearing housing. The seal groove is formed along the circumferential direction of the rotational shaft, and thus it is possible to supply air from the air pocket to the internal space from above, through the communication flow passage via the seal groove. Accordingly, it is possible to prevent lubricant oil from entering the communication flow passage from the internal space, and thus it is possible to supply air more reliably from the air pocket to the internal space.

(5) In some embodiments, in the above configuration (4), the insert member has a through groove which brings the seal groove and the internal space into communication.

According to the above configuration (5), the communication flow passage is in communication with the internal space and the air pocket via the through groove further formed on the insert member from the seal groove accommodating the seal member. While the above through groove is formed on the insert member, the insert member can be machined easily compared to the bearing housing.

(6) In some embodiments, in the above configuration (1), the air pocket is disposed partially on a curving direction side of the oil discharge pipe, at a most upstream portion of the oil discharge pipe.

According to the above configuration (6), the air pocket is disposed partially on the curving direction side of the oil discharge pipe. In this way, it is possible to ensure a relatively large capacity for the air pocket even if the oil discharge pipe has a small diameter.

(7) In some embodiments, in the above configuration (6), the air pocket is formed by a step formed between the most upstream portion of the oil discharge pipe and a protruding portion partially protruding toward an inner side of the most upstream portion, of the oil discharge port.

With the above configuration (7), it is possible to form the air pocket in the vicinity of the oil discharge port through a simple configuration, by utilizing the step formed between the protruding portion of the oil discharge port and the most upstream portion of the oil discharge pipe.

(8) In some embodiments, in the above configuration (6) or (7), the communication flow passage has an opening portion which is in communication with a convex portion from below, the convex portion bulging upward from a periphery of an inner wall of the bearing housing.

With the above configuration (8), the opening portion of the communication flow passage on the side of the internal space is disposed on the convex portion bulging upward from the periphery, disposed on the inner wall of the bearing housing. Thus, lubricant oil is less likely to enter the opening portion from the periphery, and thereby it is possible to supply air from the air pocket to the internal space reliably.

(9) In some embodiments, in the above configuration (1), the turbocharger further includes an attachment member including a canopy portion capable of making a diameter of the oil discharge port smaller than that of a most upstream portion of the oil discharge pipe by being mounted to the oil discharge port. The air pocket is formed by a step formed between the attachment member and the most upstream portion.

With the above configuration (9), the attachment member attachable to the oil discharge port has the canopy portion that makes the diameter of the oil discharge port smaller than that of the most upstream portion of the oil discharge pipe, and thereby it is possible to form the air pocket in the vicinity of the oil discharge port. By using such an attachment member, it is possible to achieve the above effect with a turbocharger of an existing design.

(10) In some embodiments, in the above configuration (9), the canopy portion is cut out partially so as to bring the air pocket and the communication flow passage into communication.

According to the above configuration (10), the canopy portion is cut out partially, and thereby it is possible to supply air to the communication flow passage from the air pocket via the cut-out portion.

(11) In some embodiments, in the above configuration (9) or (10), the attachment member includes an extending portion extending along a downstream side of the oil discharge pipe when the attachment member is mounted to the oil discharge port.

According to the above configuration (11), the attachment member has the extending portion extending along the downstream side of the oil discharge pipe, and thereby it is possible to form a gap between the extending portion and the inner wall of the oil discharge pipe, and form the air pocket more reliably.

(12) In some embodiments, in any one of the above configurations (9) to (11), the attachment member further includes a flow-passage forming portion extending upward from the oil-discharge port and forming the communication flow passage by being engaged with an inner wall surface of the bearing housing, when mounted to the oil-discharge port.

According to the above configuration (12), the flow-passage forming portion of the attachment member engages with the inner wall surface of the bearing housing, and thereby it is possible to form the communication flow passage with the flow-passage forming portion and the inner wall surface of the bearing housing. In this case, it is possible to form the communication flow passage without forming a hole on the bearing housing, and thereby it is possible to reduce the production costs even further.

(13) In some embodiments, in any one of the above configurations (9) to (11), the attachment member further includes a pipe-shaped portion which extends upward from the canopy portion and brings the internal space and the air pocket into communication.

According to the above configuration (13), the attachment member includes the pipe-shaped portion which extends upward from the canopy portion, and brings the internal space of the bearing housing and the air pocket into communication. Thus, it is possible to form the communication flow passage without forming a hole on the bearing housing, and thus it is possible to reduce the production costs even further.

(14) In some embodiments, in the above configuration (13), the pipe-shaped portion has a tip curved downward, on a side of the internal space.

According to the above configuration (14), the pipe-shaped portion has a tip on the side of the internal space curved downward, and thereby it is possible to prevent lubricant oil falling from above in the internal space of the bearing housing from entering the communication flow passage via the pipe-shaped portion, and thus it is possible to supply air more reliably from the air pocket to the internal space.

(15) In some embodiments, in the above configuration (1), the air pocket is disposed on an upper side of a pipe wall on a downstream side of a most upstream portion of the oil discharge pipe. The communication flow passage is formed by a hose member which is disposed on an inner side of the oil discharge pipe and brings the air pocket and the internal space into communication.

According to the above configuration (15), the air pocket disposed on the upper side of the pipe wall on the downstream side of the most upstream portion of the oil discharge pipe is in communication with the internal space of the bearing housing through the hose member disposed on the inner side of the oil discharge pipe, and thus it is possible to promote discharge of lubricant oil.

(16) In some embodiments, in the above configuration (1), the air pocket is disposed on an upper side of a pipe wall on a downstream side of a most upstream portion of the oil discharge pipe. The communication flow passage is formed by a communication pipe which is disposed outside the bearing housing and the oil discharge pipe and which brings the air pocket and the internal space into communication.

According to the above configuration (16), the air pocket disposed on the upper side of the pipe wall on the downstream side of the most upstream portion of the oil discharge pipe is in communication with the internal space of the bearing housing through the communication pipe disposed outside the bearing housing and the oil discharge pipe, and thus it is possible to promote discharge of lubricant oil.

Advantageous Effects

According to at least one embodiment of the present invention, it is possible to provide a turbocharger whereby it is possible to promote discharge of lubricant oil from a bearing housing through a compact and simple configuration.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First Embodiment

Figure 1:
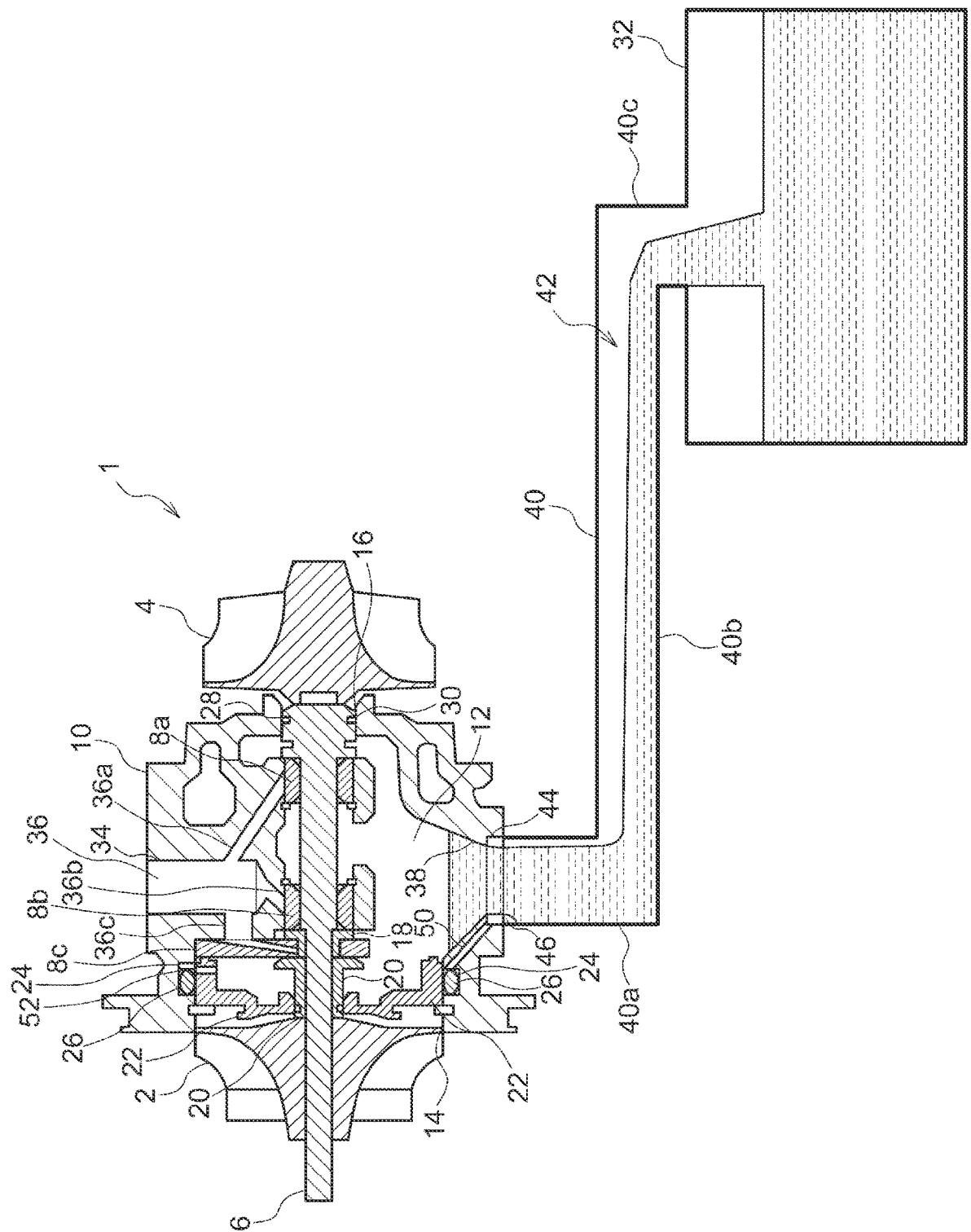
FIG. 1 is a cross-sectional view illustrating an internal structure of a turbocharger according to the first embodiment of the present invention.

FIG. 1 is a cross-sectional view illustrating an internal structure of a turbocharger 1 according to the first embodiment of the present invention. The turbocharger 1 is a supercharging device for compressing and supplying (supercharging) intake air taken from outside to a combustion chamber of an internal combustion engine, by rotary-driving a compressor 2 disposed in an intake passage of an internal combustion engine (not depicted). The turbocharger 1 of the present embodiment includes an exhaust turbine 4 disposed in an exhaust passage of an internal combustion engine, and a rotational shaft 6 coupling the exhaust turbine 4 and the compressor 2. When the exhaust turbine 4 is driven by exhaust gas flowing through the exhaust passage, the compressor 2 is driven in conjunction via the rotational shaft 6, and thereby supercharging is performed.

In the following description, as the turbocharger 1, a supercharging apparatus including the exhaust turbine 4 as described above will be described. Nevertheless, unless otherwise stated, the present invention can be also applied to an electric supercharging device driven by a motor drivable by using electric energy stored in a charging device such as a battery.

The rotational shaft is supported rotatably by bearings 8a, 8b, 8c. The bearings 8a, 8b are radial bearings for receiving a radial force acting in the radial direction of the rotational shaft 6, at two different locations in the axial direction. The bearing 8c is a thrust bearing for receiving a thrust force acting in the axial direction of the rotational shaft 6.

The bearings 8a, 8b, 8c are housed in the bearing housing 10. The bearing housing 10 has a hollow structure including the internal space 12 inside thereof, and has a first opening portion 14 having an opening on the side of the compressor 2, through which the rotational shaft 6 is insertable, and a second opening portion 16 having an opening on the side of the exhaust turbine 4, through which the rotational shaft 6 is insertable. The first opening portion 14 is formed to be larger than the second opening portion 16, and is configured such that the bearings 8a, 8b, 8c, the first sleeve 18, the second sleeve 20, and the insert member 22 are each insertable along the rotational shaft 6 from the side of the compressor 2.

Of the bearing housing 10, on a portion facing the radially outer side of the insert member 22, a seal groove 24 for placing a seal member 26 for sealing the gap between the insert member 22 and the bearing housing 10 is disposed along the circumferential direction of the rotational shaft 6. The seal member 26 is an O ring formed of an elastic material such as rubber, and is an annular member along the seal groove 24. The seal member 26 is configured to be capable of exerting a sealing effect by elastically deforming between the bearing housing 10 and the insert member 22. The seal groove 24 is formed to have some gap from the elastically deformed seal member 26.

On the second seal portion 16, a seal member 30 housed in a seal groove 28 formed along the circumferential direction on the outer peripheral surface of the rotational shaft 6 seals the gap between the rotational shaft 6 and the bearing housing 10. The seal member 30 is a piston ring formed of metal, for instance, and is an annular member along the seal groove 28.

Further, the bearing housing 10 has a lubricating structure for lubricating the bearings 8a, 8b, 8c housed inside thereof. On the upper portion of the bearing housing 10, an oil supply port 34 for supplying lubricant oil via a supply passage (not depicted) from the oil pan 32 is provided. The lubricant oil supplied to the oil support port 34 is supplied to the bearings 8a, 8b, 8c via the lubricant-oil supply passage 36 formed inside the bearing housing 10. The lubricant-oil supply passage 36 branches inside the bearing housing 10, and includes a first lubricant-oil supply passage 36a for supplying lubricant oil to the bearing 8a, a second lubricant-oil supply passage 36b for supplying lubricant oil to the bearing 8b, and a third lubricant-oil supply passage 36c for supplying lubricant oil to the bearing 8c.

The lubricant oil discharged from the bearings 8a, 8b, 8c are stored on the bottom side of the internal space 12. An oil discharge port 38 is disposed on the bottom side of the internal space 12, and is configured such that the lubricant oil returns to the oil pan 32 via an oil discharge pipe 40 connected to the oil discharge port 38. The oil discharge port 38 has a substantially cone shape whose cross-sectional area decreases downward, and is configured to guide lubricant oil stored in the internal space 12 to the oil discharge pipe 40.

Furthermore, the oil pan 32 is formed integrally with a crank case (not depicted) housing a crank mechanism for converting a reciprocating motion of the internal combustion engine into a rotational motion.

The oil discharge pipe 40 is a pipe-shaped member for guiding lubricant oil discharged from the oil discharge pipe 38 to the oil pan 32. The shape of the oil discharge pipe 40 is not particularly limited. In the present embodiment, the oil discharge pipe 40 has a curved shape including the first region 40a extending downward from the oil discharge port 38, the second region 40b extending horizontally from the downstream side of the first region 40a toward the right side, and the third region 40c extending downward from the downstream side of the second region 40b and connected to the oil pan 32.

In the second region 40b of the oil discharge pipe 40 having the above shape, as shown in FIG. 1, lubricant oil discharged from the oil discharge pipe 38 is biased downward due to the effect of the gravity, and a gap 42 is formed above the lubricant oil, where air can accumulate. In the present embodiment, the oil discharge port 38 is formed to have a smaller diameter than the most upstream portion of the oil discharge pipe 40, and thereby an air pocket 46 is formed in the uppermost portion of the oil discharge pipe 40, due to a step 44 formed between the oil discharge port 38 and the oil discharge pipe 40. That is, when a part of air accumulated in the gap 42 formed in the second region 40b of the oil discharge pipe 40 flows upward, the air is captured by the step 44, and forms the air pocket 46.

Such an air pocket 46 is in communication with the internal space 12 of the bearing housing 10 via a communication flow passage 50. The oil discharge port 38 is likely to become blocked due to merging of lubricant oil flowing from different locations in the bearing housing 10. However, by guiding air from the air pocket 46 to the internal space 12 via the communication flow passage 50, it is possible to promote discharge of lubricant oil from the oil discharge port 38.

The communication flow passage 50 is configured to bring the air pocket 46 and the internal space 12 of the bearing housing 10 into communication. In the present embodiment, the communication flow passage 50 is formed as a through hole formed by making a hole on the bearing housing 10, and extends from a position adjacent to the air pocket 46 formed on the most upstream portion of oil discharge pipe 40 of the bearing housing 10 to the seal groove 24 along the inner wall of the oil discharge port 38. As described above, the seal groove 24 is formed to have an annular shape along the circumferential direction of the rotational shaft 6, and is in communication with the internal space 12 via the through groove 52 formed on the insert member 22 on the upper side of the rotational shaft 6. As described above, the air pocket 46 is in communication with the internal space 12 from above via the communication flow passage 50, and thus it is possible to prevent blockage due to lubricant oil discharged from the bearings 8a, 8b, 8c entering the communication flow passage 50, in the internal space 12. As a result, it is possible to supply air from the air pocket 46 to the internal space 12 reliably.

While the through groove 52 is formed on the insert member 22, the insert member 22 can be machined easily compared to the bearing housing 10.

Further, the air pocket 46 is formed along the entire length, with respect to the circumferential direction, of the oil discharge port 38, at the most upstream portion of the oil discharge pipe 40. In the present embodiment, the oil discharge pipe 40 has a shape curved toward the right in FIG. 1, as described above, and thus air from the side of the oil pan 32 ascends along the right inner wall of the oil discharge pipe 40. Thus, at the uppermost portion of the oil discharge pipe 40, by providing the step 44 so that the air pocket 46 is formed along the entire length in the circumferential direction, it is possible to introduce air smoothly from the side of the oil pan 32 into the communication flow passage 50 formed on the left side of the oil discharge pipe 40 (that is, opposite to the curving direction of the oil discharge pipe 40). In other words, by forming the air pocket 46 along the entire length of the oil discharge port 38 with respect to the circumferential direction, it is possible to address different shapes of the oil discharge pipe 40 with the same configuration.

Second Embodiment

Figure 2:
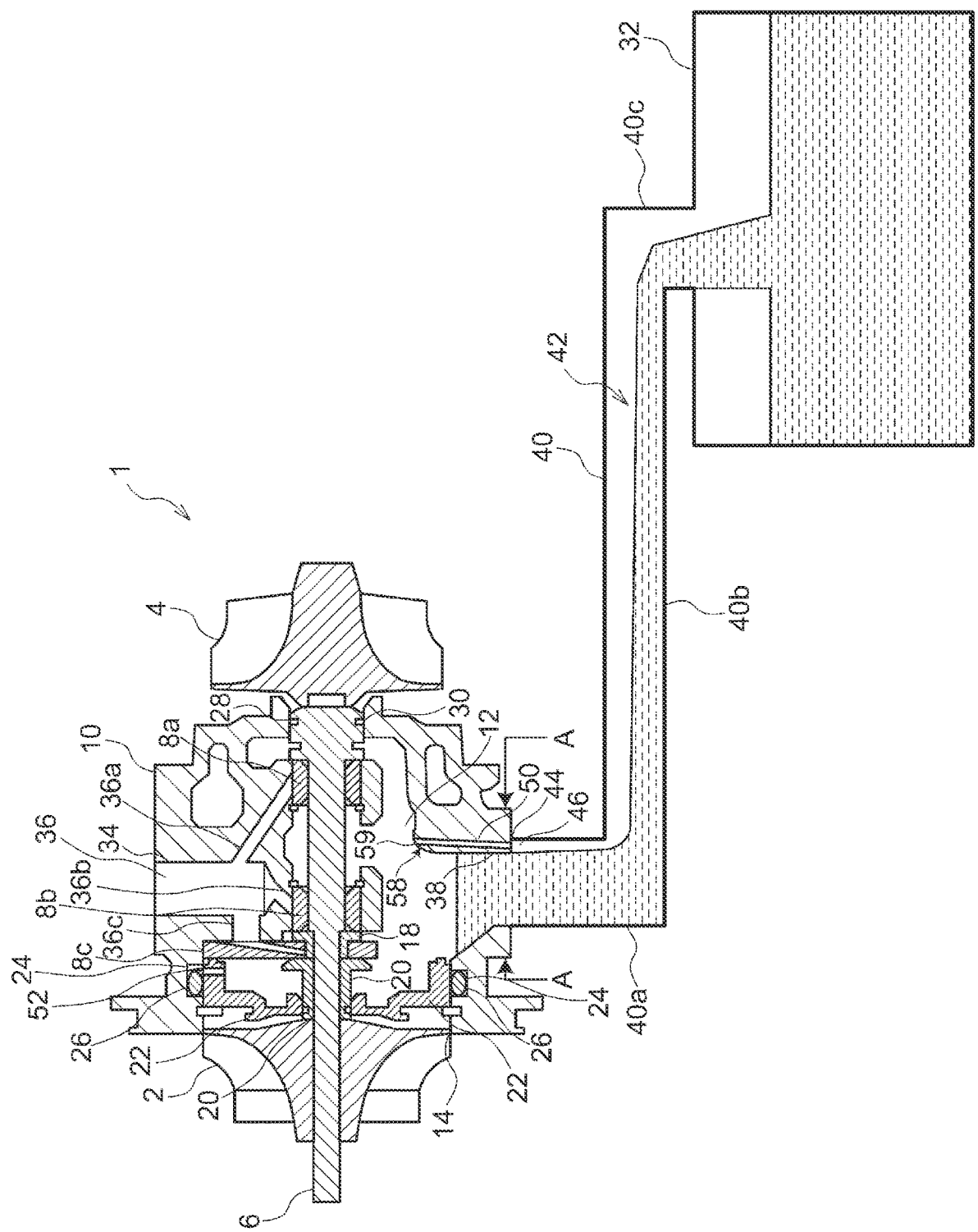
FIG. 2 is a cross-sectional view illustrating an internal structure of a turbocharger according to the second embodiment of the present invention.
Figure 3:
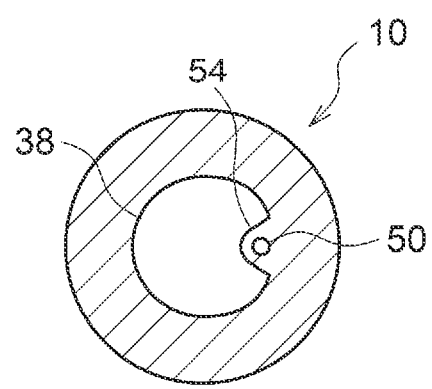
FIG. 3 is a cross-sectional view taken along line A-A in FIG. 2.

FIG. 2 is a cross-sectional view illustrating an internal structure of a turbocharger 1 according to the second embodiment of the present invention, and FIG. 3 is a cross-sectional view of FIG. 2 taken along line A-A. In the following description, the same features in the above embodiment are associated with the same reference numerals, and not described again unless otherwise stated.

In the present embodiment, the air pocket 46 is formed on the curving direction side of the oil discharge pipe 40 on the most upstream portion of the oil discharge pipe 40, and the communication flow passage 50 is formed in the vicinity of the oil discharge port 38 on the curving direction side of the oil discharge pipe 40, of the bearing housing 10, so as to correspond to the air pocket 46. To form such an air pocket 46, as shown in FIG. 3, the oil discharge port 38 has a protruding portion 54 protruding partially toward the curving direction side of the oil discharge pipe 40, and thereby has the step 44 between the oil discharge port 38 and the oil discharge pipe 40 having a substantially circular shape. That is, the air pocket 46 according to the present embodiment is formed by providing the step 44 partially in the circumferential direction.

By forming the air pocket 46 partially on the curving direction side of the uppermost portion of the oil discharge pipe 40, it is possible to reduce the length of the communication flow passage 50 efficiently, reduce the machining load of the bearing housing 10, and cut production costs. Furthermore, even if the enlargement amount of the pipe diameter of the oil discharge pipe 40 is reduced, it is possible to form a relatively large air pocket 46. That is, it is possible to achieve the above effect through a compact configuration.

Further, the communication flow passage 50 has an opening portion 59 being in communication with a convex portion 58 from downward, the convex portion 58 bulging upward from its periphery of the inner wall of the bearing housing 10. In the internal space 12, lubricant oil discharged from the bearings 8a, 8b, 8c is collected to the oil discharge port 38 via the inner wall. By providing the opening portion 59 on the convex portion 58 bulging from the periphery that surrounds the convex portion 58, it is possible to prevent lubricant oil running on the inner wall from entering the communication flow passage 50 to cause blockage. As a result, it is possible to supply air from the air pocket 46 to the internal space 12 reliably.

Third Embodiment

Figure 4:
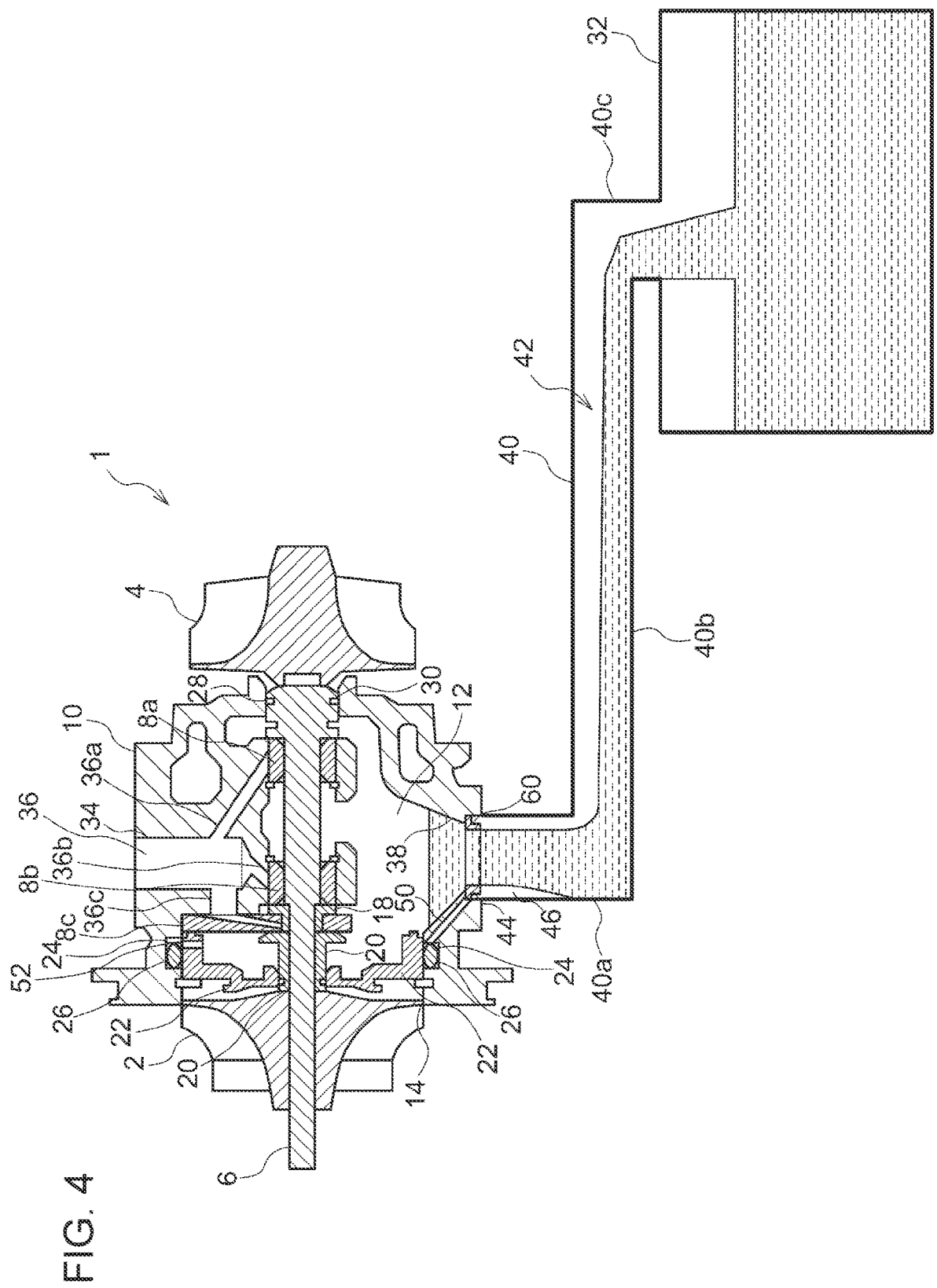
FIG. 4 is a cross-sectional view of an internal structure of a turbocharger according to the third embodiment of the present invention.
Figure 5:
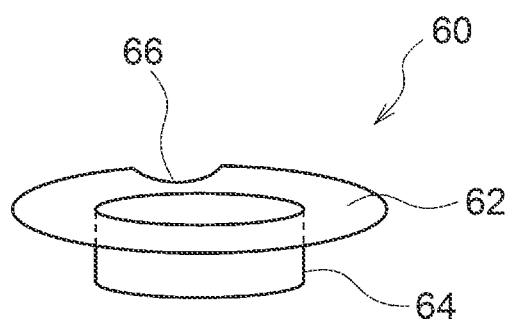
FIG. 5 is a perspective view illustrating an attachment member of FIG. 4.

FIG. 4 is a cross-sectional view illustrating an internal structure of a turbocharger 1 according to the third embodiment of the present invention, and FIG. 5 is a perspective view illustrating only the attachment member 60 of FIG. 4. In the following description, the same features in the above embodiment are associated with the same reference numerals, and not described again unless otherwise stated.

In the turbocharger 1 according to the present embodiment, the oil discharge port 38 and the uppermost portion of the oil discharge pipe 40 have the substantially same diameter. That is, as described above, the step 44 for forming the air pocket 46 is not provided between the oil discharge port 38 and the uppermost portion of the oil discharge pipe 40, like the typical configuration. In the present embodiment, the turbocharger 1 further includes an attachment member 60 that is attachable to the oil discharge port 38.

As shown in FIG. 5, the attachment member 60 has a canopy portion 62 having a substantially disc shape, and an extending portion 64 extending downward from the canopy portion. The canopy portion 62 has a greater diameter than the oil discharge port 38, and is configured to be capable of limiting the position of the attachment member 60 by being engaged with the oil discharge port 38 when mounted to the oil discharge port 38 from the upper side (the side of the internal space 12).

Furthermore, the inner diameter of the canopy portion 62 is smaller than the opening diameter of the oil discharge port 38, and thereby the oil discharge port 38 has a smaller diameter than the most upstream portion of the oil discharge pipe 40 when the attachment member 60 is mounted to the oil discharge port 38. Accordingly, a step 44 is formed between the canopy portion 62 of the attachment member 60 mounted to the oil discharge port 38 and the uppermost portion of the oil discharge pipe 40, and thereby it is possible to form the air pocket 46 in the uppermost portion of the oil discharge port 38.

Further, the canopy portion 62 has a cut-out portion 66 formed partially so as to bring the air pocket 46 and the communication flow passage 50 formed on the side of the bearing housing 10 into communication. Thus, it is possible to supply air to the communication flow passage 50 from the air pocket 46 via the cut-out portion 66. As described above, in the present embodiment, it is possible to obtain a similar effect to that of the above described embodiment, by attaching the attachment member 60 to the turbocharger of a typical configuration in which the oil discharge port 38 and the uppermost portion of the oil discharge pipe 40 have the substantially same diameter.

Figure 6:
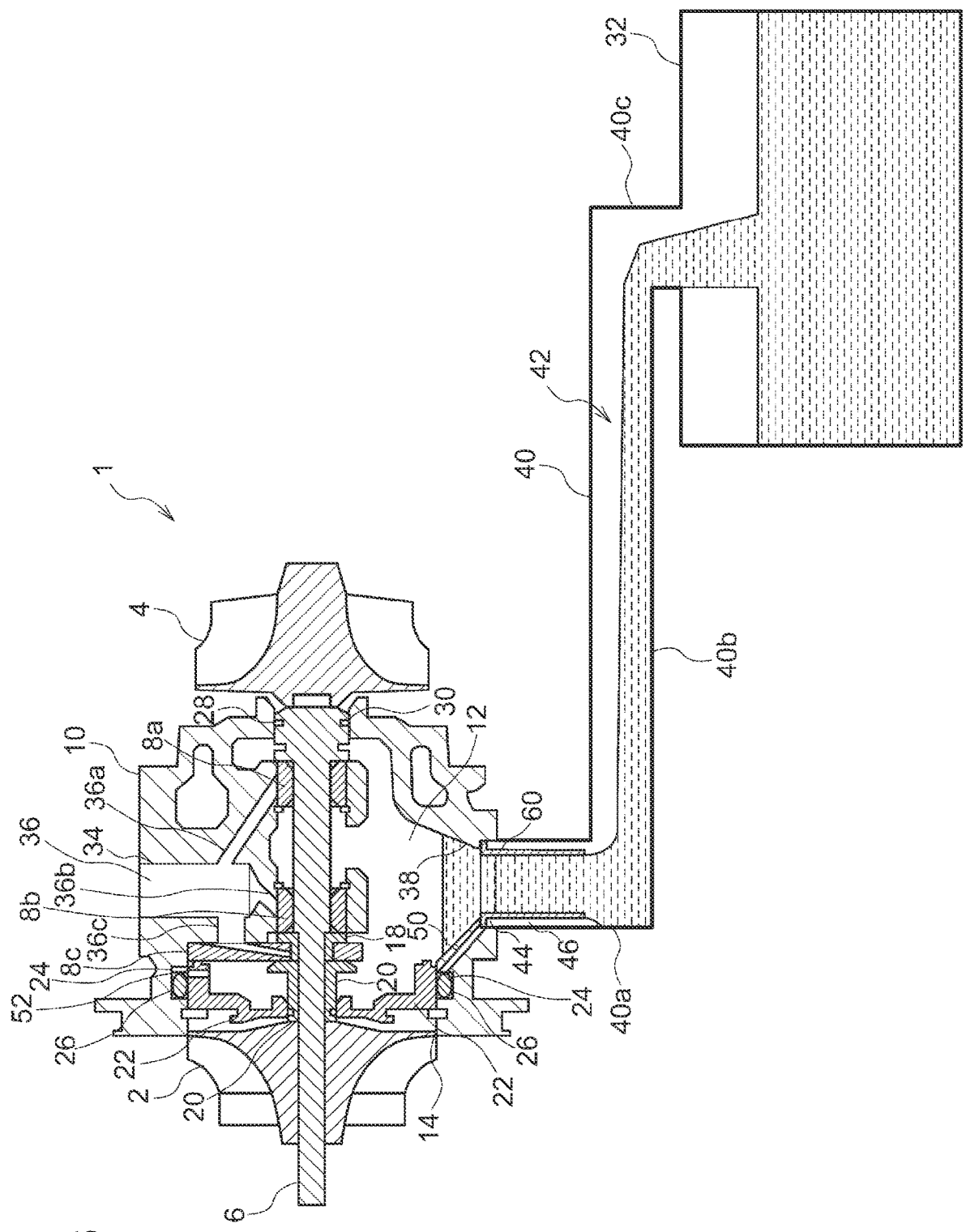
FIG. 6 is a modified example of FIG. 4.
Figure 7:
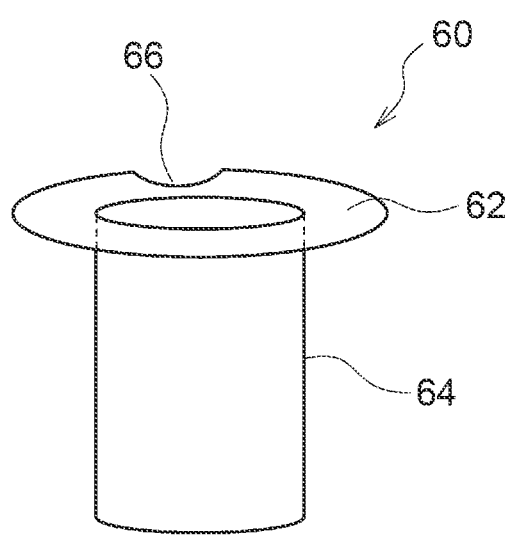
FIG. 7 is a perspective view illustrating an attachment member of FIG. 6.

Furthermore, the attachment member 60 has the extending portion 64 extending along the downstream side of the oil discharge pipe 40, and thereby it is possible to form the air pocket 46 reliably on the most upstream portion of the oil discharge pipe 40. Herein, FIG. 6 illustrates a modified example of FIG. 4, and FIG. 7 is a perspective view illustrating only the attachment member 60 of FIG. 6. Such an extending portion 64 may be formed long to the downstream side of the oil discharge pipe 40, as shown in FIGS. 6 and 7.

Fourth Embodiment

Figure 8:
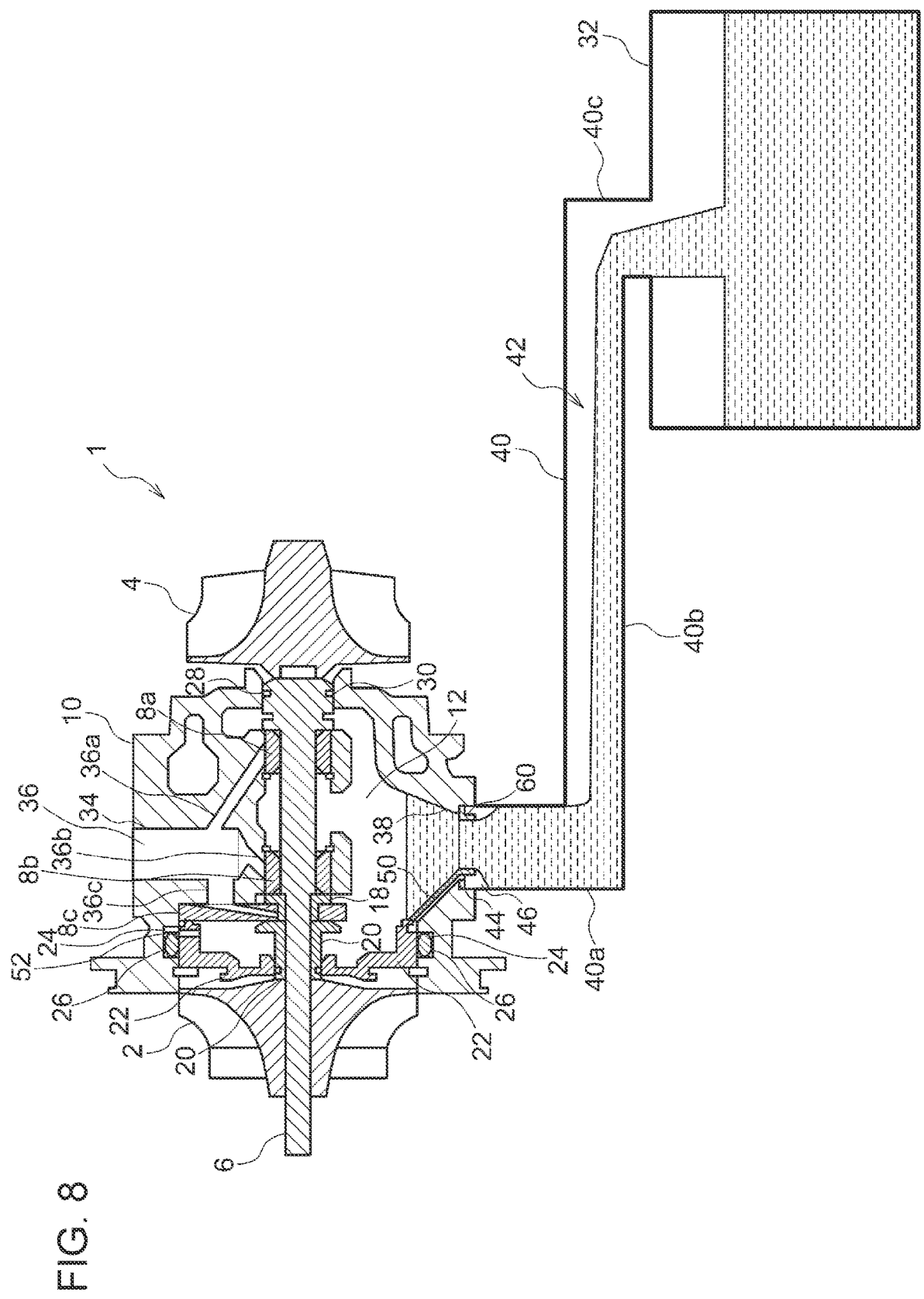
FIG. 8 is a cross-sectional view of an internal structure of a turbocharger according to the fourth embodiment of the present invention.
Figure 9:
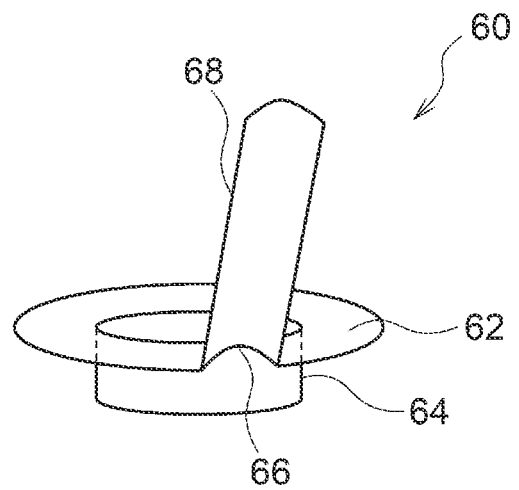
FIG. 9 is a perspective view illustrating an attachment member of FIG. 8.

FIG. 8 is a cross-sectional view illustrating an internal structure of a turbocharger 1 according to the fourth embodiment of the present invention, and FIG. 9 is a perspective view illustrating only the attachment member 60 of FIG. 8. In the following description, the same features in the above embodiment are associated with the same reference numerals, and not described again unless otherwise stated.

In the present embodiment, the turbocharger 1 further includes an attachment member 60 that is attachable to the oil discharge port 38, like the above described third embodiment. As shown in FIG. 9, the attachment member 60 of the present embodiment has a canopy portion 62 having a substantially disc shape, an extending portion 64 extending downward from the canopy portion 62, and a flow-passage forming portion 68 extending upward from the canopy portion 62.

The canopy portion 62 and the extending portion 64 are the same as those in the third embodiment, and thus not described again in detail.

The flow-passage forming portion 68 extends upward from the oil discharge port 38 when the attachment member 60 is mounted to the oil discharge port 38, and is engaged with the inner wall surface of the bearing housing 10 (inner surface of the bearing housing 10 in the vicinity of the oil discharge port 38), thereby forming the communication flow passage 50. As shown in FIG. 9, the flow-passage forming portion 68 has a substantially half cylindrical shape, and has an end portion in contact with the inner wall surface of the bearing housing 10. Accordingly, the inner surface of the flow-passage forming portion 68 and the inner wall surface of the bearing housing 10 define the communication flow passage 50. As described above, in the present embodiment, unlike the other embodiments described above, it is possible to form the communication flow passage 50 without forming a hole on the bearing housing 10, which is advantageous in terms of production costs.

Figure 10:
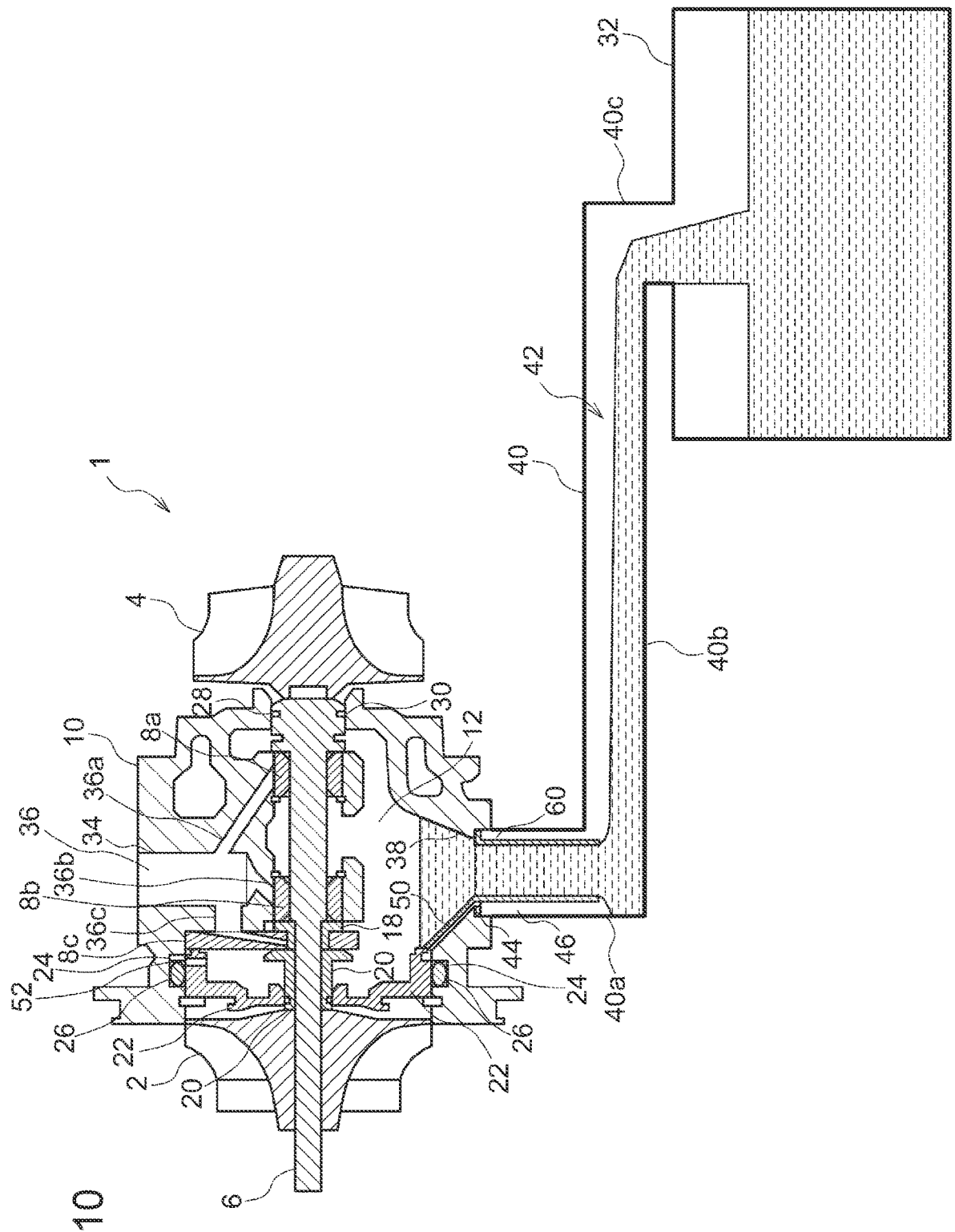
FIG. 10 is a modified example of FIG. 8.
Figure 11:
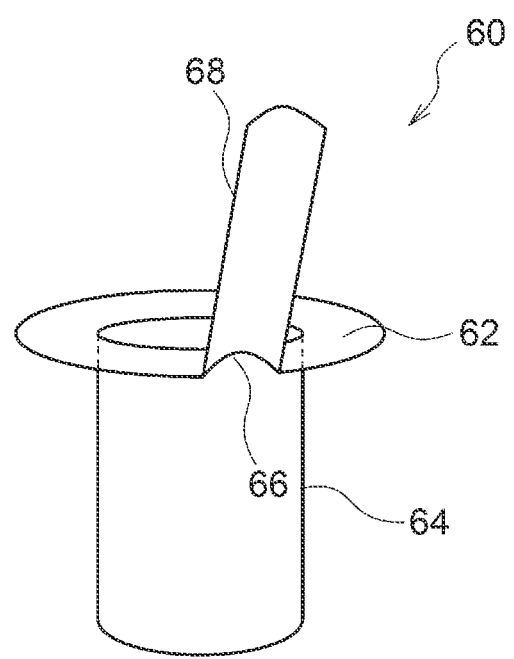
FIG. 11 is a perspective view illustrating an attachment member of FIG. 10.

Herein, FIG. 10 illustrates a modified example of FIG. 8, and FIG. 11 is a perspective view illustrating the attachment member 60 of FIG. 10. In this modified example, an extending portion 64 is formed long to the downstream side of the oil discharge pipe 40, as shown in FIGS. 6 and 7. By providing such an extending portion 64, it is possible to form the air pocket 46 more reliably on the most upstream portion of the oil discharge pipe 40, also in the fourth embodiment.

Fifth Embodiment

Figure 12:
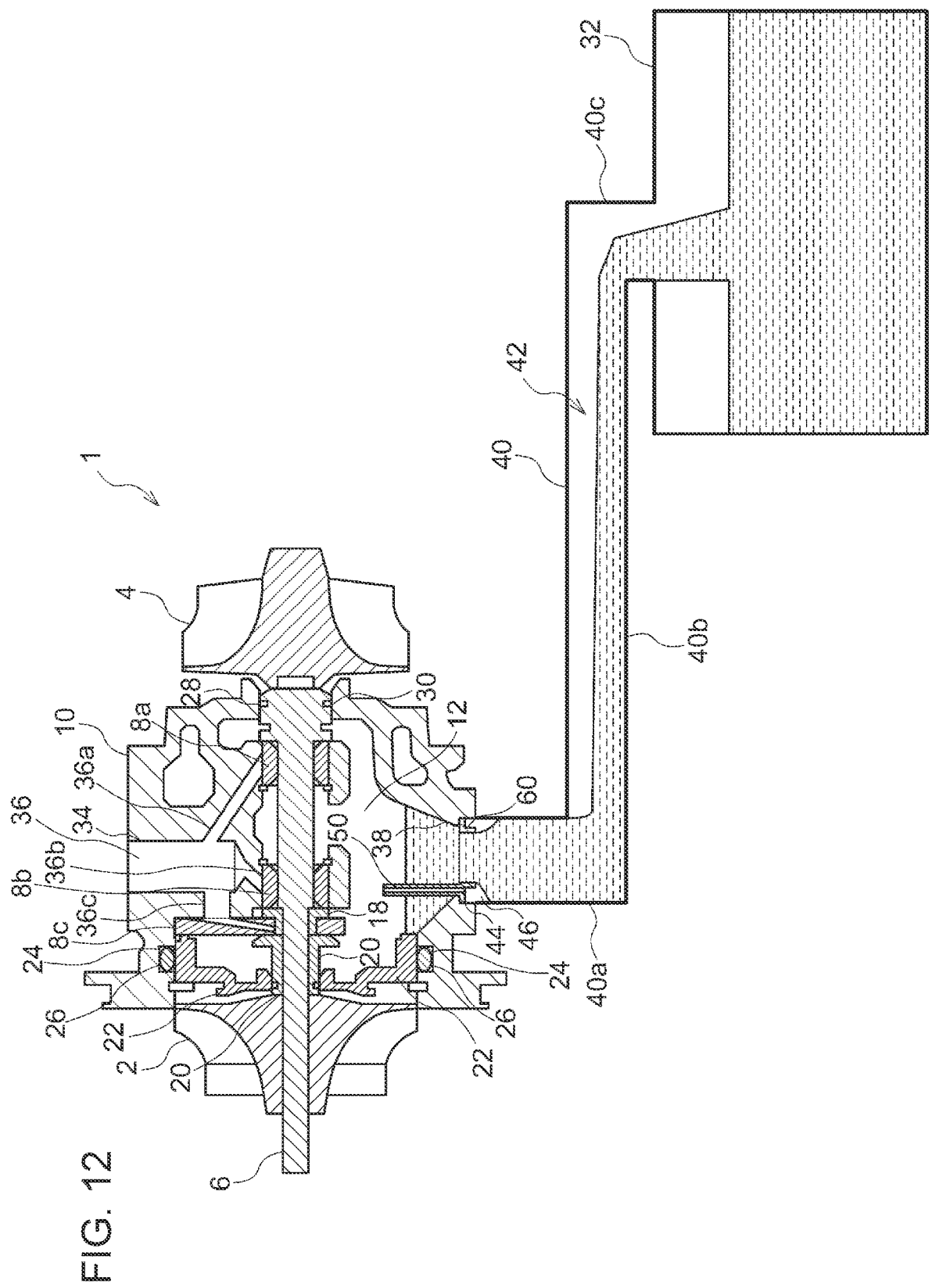
FIG. 12 is a cross-sectional view of an internal structure of a turbocharger according to the fifth embodiment of the present invention.
Figure 13:
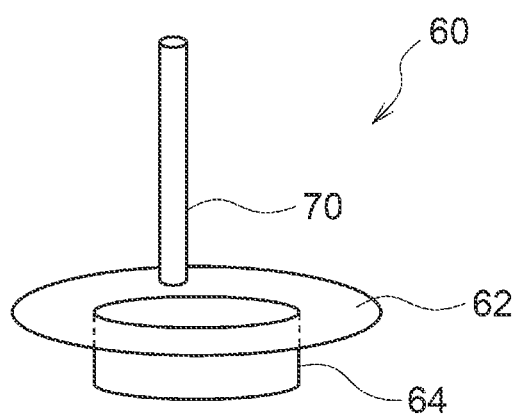
FIG. 13 is a perspective view illustrating only an attachment member of FIG. 12.

FIG. 12 is a cross-sectional view illustrating an internal structure of a turbocharger 1 according to the fifth embodiment of the present invention, and FIG. 13 is a perspective view illustrating only the attachment member 60 of FIG. 12. In the following description, the same features in the above embodiment are associated with the same reference numerals, and not described again unless otherwise stated.

In the present embodiment, the turbocharger 1 further includes an attachment member 60 that is attachable to the oil discharge port 38, like the above described third and fourth embodiments. As shown in FIG. 11, the attachment member 60 of the present embodiment has a canopy portion 62 having a substantially disc shape, an extending portion 64 extending downward from the canopy portion 62, and a pipe-shaped portion 70 extending upward from the canopy portion 62.

The canopy portion 62 and the extending portion 64 are the same as those in the third and fourth embodiments, and thus not described again in detail.

The pipe-shaped portion 70 extends upward from the canopy portion 62 when the attachment member 60 is mounted to the oil discharge port 38, and forms the communication flow passage 50 that brings the internal space 12 of the bearing housing 10 and the air pocket 46 into communication. As depicted in FIG. 8, the pipe-shaped portion 70 extends above the oil surface of the lubricant oil of the lubricant oil in the internal space 12, and has a closed substantially cylindrical shape in cross section. As described above, in the present embodiment, unlike the other embodiments described above, it is possible to form the communication flow passage 50 without forming a hole on the bearing housing 10, which is advantageous in terms of production costs.

Figure 14:
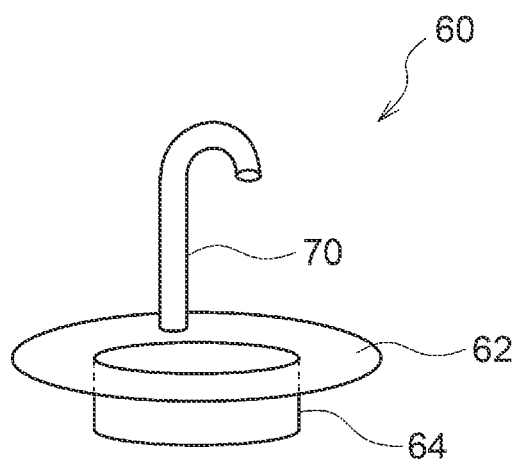
FIG. 14 is a modified example of FIG. 13.

FIG. 14 is a modified example of FIG. 13. In the modified example, the tip of the pipe-shaped portion 70 on the side of the internal space 12 is curved downward. Furthermore, the tip of the pipe-shaped portion 70 on the side of the internal space 12 is designed to be positioned above the oil surface of the lubricant oil stored in the internal space 12.

In the internal space 12, the lubricant oil discharged from the bearings 8a, 8b, 8c scatter due to the rotational shaft 6 or the like being driven. However, with the tip of the pipe-shaped portion 70 on the side of the internal space 12 curved downward, it is possible to effectively prevent scattered lubricant oil from entering the communication flow passage 50 and causing blockage. As a result, it is possible to supply air from the air pocket 46 to the internal space 12 reliably.

Furthermore, as a further modified example, for the pipe-shaped portion 70 having a straight shape depicted in FIG. 13, a cover that covers the tip on the side of the internal space 12 at least partially may be provided.

Sixth Embodiment

Figure 15:
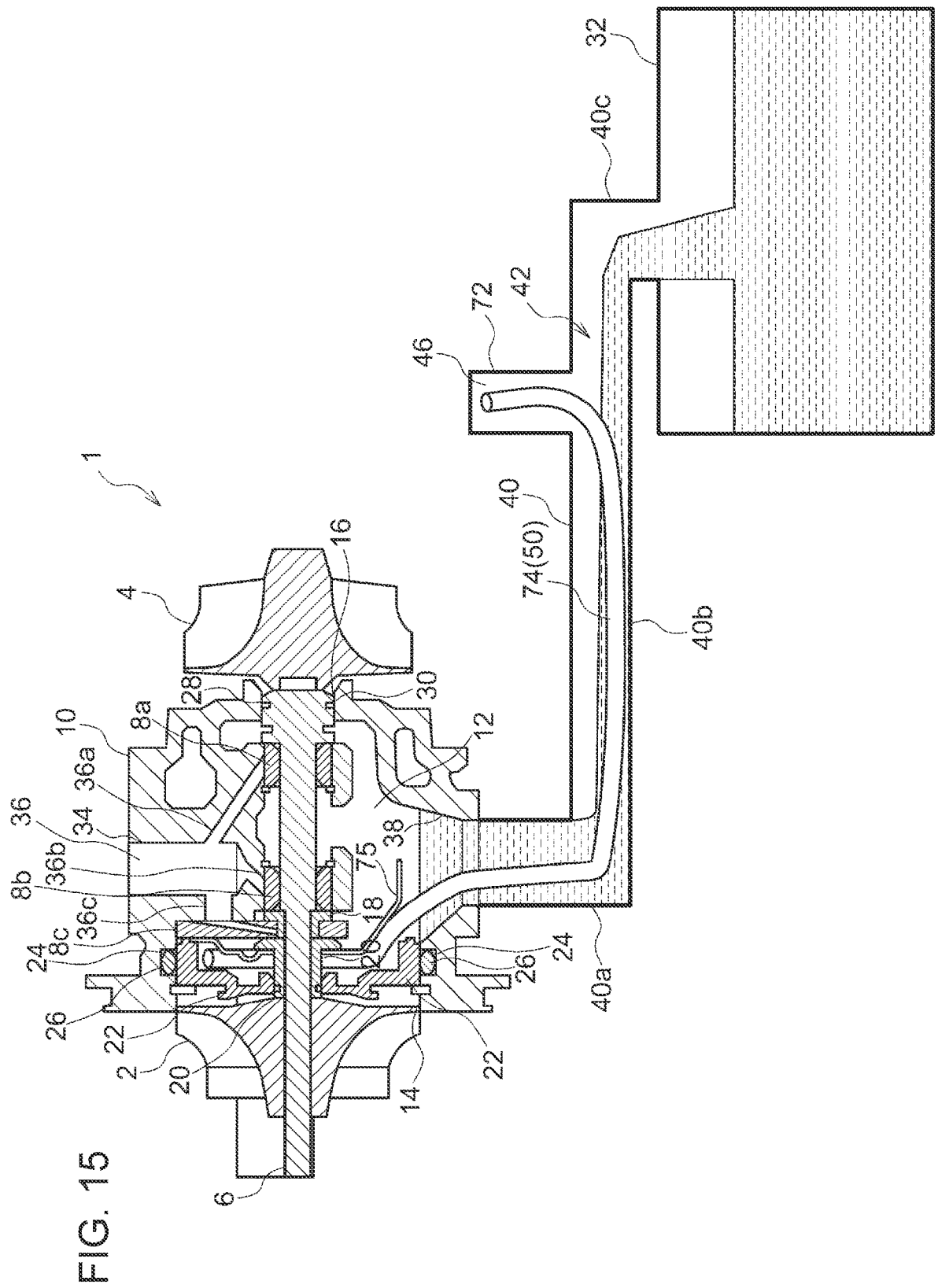
FIG. 15 is a cross-sectional view of an internal structure of a turbocharger according to the sixth embodiment of the present invention.

FIG. 15 is a cross-sectional view illustrating an internal structure of a turbocharger 1 according to the sixth embodiment of the present invention. In the following description, the same features in the above embodiment are associated with the same reference numerals, and not described again unless otherwise stated.

In the present embodiment, the air pocket 46 is formed by utilizing the space 72 formed on the upper side of the pipe wall on the downstream side of the most upstream portion of the oil discharge pipe 40. In the example depicted in FIG. 15, a space 72 is formed so that a part of the pipe wall above the second region 40b extending along the substantially horizontal direction, of the oil discharge pipe 40, protrudes outward. In the space 72, air rising through the lubricant oil from the side of the oil pan 32 accumulates, and the air pocket 46 is formed.

Inside the oil discharge pipe 40, a communication flow passage 50 which brings the air pocket 46 and the internal space 12 into communication is formed by a hose member 74 arranged along the extending direction of the oil discharge pipe 40. The hose member 74 is a pipe-shaped member that has an end having an opening into the air pocket 46, and another end having an opening into the internal space 12, and thereby brings the air pocket 46 and the internal space 12 into communication. The hose member 74 is formed of an elastic material such as rubber and thus is deformable in accordance with the shape of the oil discharge pipe 40, and guides air accumulated in the air pocket 46 to the internal space 12 to promote discharge of lubricant oil from the internal space 12.

Furthermore, it is preferable if entry of lubricant oil into the hose member 74 from an end portion of the hose member 74 on the side of the internal space 12 is prevented. In this case, the end portion of the hose member 74 on the side of the internal space 12 may be disposed above the internal space 12 of the bearing housing 10. Further, as depicted in FIG. 15, an oil deflector 75 for preventing scattering of lubricant oil from the thrust bearing 8c in the bearing housing 10 may be provided, and the end portion of the hose member 74 on the side of the internal space 12 may be disposed on the insert side (that is, the side where the lubricant oil does not scatter) of the oil deflector 75.

Accordingly, in the present embodiment, by fottning the space 72 in a region closer to the oil pan 32 to which air is supplied, compared to the most upstream portion of the oil discharge pipe 40, it is possible to ensure the air pocket 46 more reliably.

Figure 16:
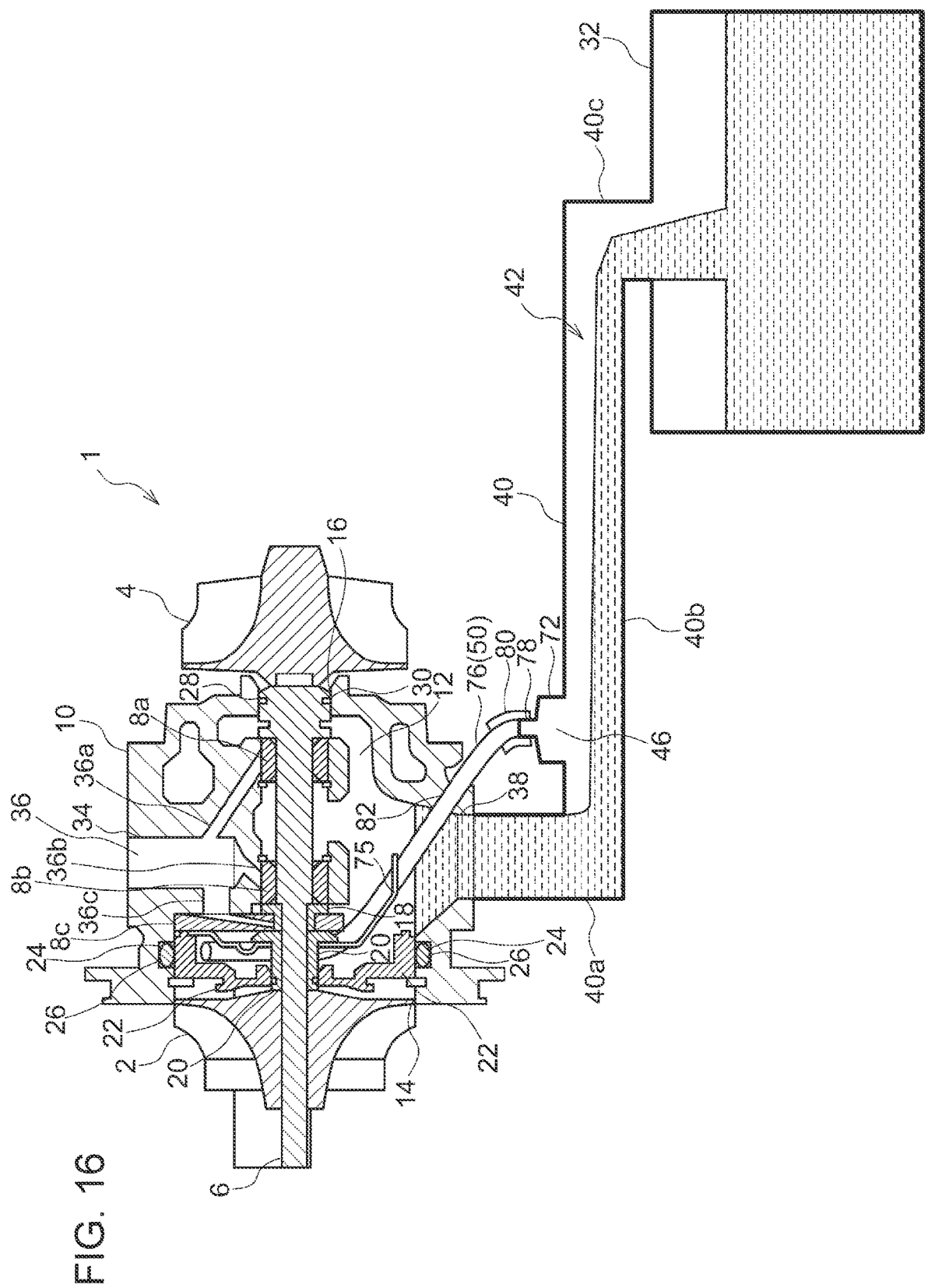
FIG. 16 is a modified example of FIG. 15.

FIG. 16 is a modified example of FIG. 15. In this modified example, for the space 72 in which the air pocket 46 is formed, the communication flow passage 50 is formed by the communication pipe 76 connected from the outer side of the oil discharge pipe 40. The communication pipe 76 passes outside the turbocharger 1, and thus it is preferable to form the communication pipe 76 from a rigid material such as metal to ensure reliability. In this case, the communication pipe 76 may be coupled to an introduction outlet 78 formed in the space 72, via a connection pipe 80 formed of an elastic material such as rubber. Accordingly, it is possible to prevent propagation of fatigue due to transmission of vibration of the body side of the turbocharger 1 to the connection portion of the communication pipe 76, which makes it possible to maintain a high reliability for long time. As described above, the communication pipe 76 has an end having an opening into the air pocket 46 of the space 72 via the connection pipe 80, and another end having an opening into the internal space 12, thus bringing the air pocket 46 and the internal space 12 into communication.

Furthermore, at the side of the internal space 12, the communication pipe 76 is in communication with the internal space 12 via a through hole 82 formed on the bearing housing 10, and thereby the tip of the communication pipe 76 is exposed to the internal space 12.

Furthermore, it is preferable if entry of lubricant oil into the communication pipe 76 from an end portion of the communication pipe 76 on the side of the internal space 12 is prevented. In this case, the end portion of the communication pipe 76 on the side of the internal space 12 may be disposed above the internal space 12 of the bearing housing 10. Further, as depicted in FIG. 16, an oil deflector 75 for preventing scattering of lubricant oil from the thrust bearing 8c in the bearing housing 10 may be provided, and the end portion of the communication pipe 76 on the side of the internal space 12 may be disposed on the insert side (that is, the side where the lubricant oil does not scatter) of the oil deflector 75.

As described above, according to each embodiment of the present invention, by providing the communication flow passage 50 that brings the air pocket 46 and the internal space 12 of the bearing housing 10 into communication, it is possible to provide a turbocharger 1 whereby it is possible to promote discharge of lubricant oil from the internal space 12.

INDUSTRIAL APPLICABILITY

The present disclosure is applicable to a turbocharger for supercharging an internal combustion engine.

DESCRIPTION OF REFERENCE NUMERALS

1 Turbocharger
2 Compressor
4 Exhaust turbine
6 Rotational shaft
8a, 8b, 8c Bearing
10 Bearing housing
12 Internal space
14 First opening portion
16 Second seal portion
18 First sleeve
20 Second sleeve
22 Insert member
24, 28 Seal groove
26, 30 Seal member
32 Oil pan
34 Oil support port
36 Lubricant-oil supply passage
38 Oil discharge port
40 Oil discharge pipe
42 Gap
44 Step
50 Communication flow passage
52 Through groove
54 Protruding portion
58 Convex portion
59 Opening portion
60 Attachment member
62 Canopy portion
64 Extending portion
66 Cut-out portion
68 Flow-passage forming portion
70 Pipe-shaped portion
72 Space
74 Hose member
76 Communication pipe
78 Introduction outlet
80 Connection pipe
82 Through hole

The invention claimed is:
1. A turbocharger for supercharging an internal combustion engine, comprising:
a bearing housing which accommodates a bearing supporting a rotational shaft of the turbocharger;
an oil discharge pipe connected to an oil discharge port for discharging lubricant oil stored in an internal space of the bearing housing;
a communication flow passage which brings an air pocket formed between the oil discharge port and the oil discharge pipe and the internal space into communication,
wherein the air pocket is disposed along a circumferential direction of the oil discharge port, at a most upstream portion of the oil discharge pipe,
wherein the oil discharge port has a substantially cone shape whose cross-sectional area decreases downward, and
wherein the communication flow passage extends along an inner surface of the oil discharge port.
2. The turbocharger according to claim 1,
wherein the air pocket is formed by a step formed between the most upstream portion of the oil discharge pipe and the oil discharge port having a smaller diameter than the most upstream portion.
3. The turbocharger according to claim 1, further comprising:
an insert member inserted into the internal space; and
a seal member disposed along a circumferential direction of the rotational shaft to seal a gap between the insert member and the bearing housing, and being an annular member formed of an elastic material,
wherein the communication flow passage is in communication with the internal space from above, via a seal groove formed on the bearing housing to accommodate the seal member.
4. The turbocharger according to claim 3,
wherein the insert member has a through groove which brings the seal groove and the internal space into communication.
5. The turbocharger according to claim 1,
wherein the air pocket is disposed partially on a curving direction side of the oil discharge pipe, at a most upstream portion of the oil discharge pipe.
6. The turbocharger according to claim 5,
wherein the air pocket is formed by a step formed between the most upstream portion of the oil discharge pipe and a protruding portion partially protruding toward an inner side of the most upstream portion, of the oil discharge port.
7. The turbocharger according to claim 5,
wherein the communication flow passage has an opening portion which is in communication with a convex portion from below, the convex portion positioned upward from a periphery of an inner wall of the bearing housing.
8. A turbocharger for supercharging an internal combustion engine, comprising:
a bearing housing which accommodates a bearing supporting a rotational shaft of the turbocharger;
an oil discharge pipe connected to an oil discharge port for discharging lubricant oil stored in an internal space of the bearing housing;
a communication flow passage which brings an air pocket formed between the oil discharge port and the oil discharge pip and the internal space into communication, wherein the air pocket is disposed along a circumferential direction of the oil discharge port at a most upstream portion of the oil discharge pipe, wherein the turbocharger further comprising an attachment member including a canopy portion having an opening of which diameter is smaller than that of a most upstream portion of the oil discharge pipe and capable of limiting a position of the attachment member by being engaged with the oil discharge port, wherein the air pocket is formed by a step formed between the attachment member and the oil discharge pipe, and wherein the canopy portion is cut out partially so as to bring the air pocket and the communication flow passage into communication.

9. The turbocharger according to claim 8, wherein the attachment member includes an extending portion extending along a downstream side of the oil discharge pipe when the attachment member is mounted to the oil discharge port.

10. The turbocharger according to claim 8, wherein the attachment member further comprises a flow-passage forming portion extending upward from the oil-discharge port and forming the communication flow passage by being engaged with an inner wall surface of the bearing housing, when mounted to the oil-discharge port.

11. The turbocharger according to claim 8, wherein the attachment member further comprises a pipe-shaped portion which extends upward from the canopy portion and brings the internal space and the air pocket into communication.

12. The turbocharger according to claim 11, wherein the pipe-shaped portion has a tip curved downward, on a side of the internal space.

* * * * *